United States Patent [19]

Seshamani et al.

[11] Patent Number: 4,712,938

[45] Date of Patent: Dec. 15, 1987

[54] EXPANSION SEAL ASSEMBLY

[75] Inventors: Venkatraman Seshamani, Gillette; Dudley P. Money, Parsippany, both of N.J.

[73] Assignee: Foster Wheeler Energy Corporation, Livingston, N.J.

[21] Appl. No.: 818,468

[22] Filed: Jan. 13, 1986

[51] Int. Cl.$^4$ ............................................ E02D 29/12
[52] U.S. Cl. ...................................... 403/24; 403/50; 285/224; 98/60; 126/314
[58] Field of Search ...................... 98/60; 126/314; 285/353, 224, 226; 403/28, 29, 30, 50, 51, 24

[56] References Cited

U.S. PATENT DOCUMENTS

| | | | |
|---|---|---|---|
| 731,336 | 6/1903 | Brown | 126/314 |
| 1,854,515 | 4/1932 | Jackes | 98/60 |
| 2,014,643 | 9/1935 | Bakker . | |
| 2,075,419 | 3/1937 | Andrews et al. . | |
| 2,375,841 | 5/1945 | Foresman . | |
| 2,797,112 | 6/1957 | Ziebold | 285/226 |
| 3,029,798 | 4/1962 | Folds . | |
| 3,310,038 | 3/1967 | Kuchelbacher . | |
| 3,364,905 | 1/1968 | Jordan . | |
| 3,551,009 | 12/1970 | Cammuso et al. | 285/226 |
| 3,592,171 | 7/1971 | Bernstein . | |
| 4,475,845 | 10/1984 | Odill et al. | 403/50 |

FOREIGN PATENT DOCUMENTS

| | | | |
|---|---|---|---|
| 354372 | 8/1931 | United Kingdom | 285/226 |
| 936539 | 9/1963 | United Kingdom . | |
| 520486 | 7/1976 | U.S.S.R. | 285/353 |

*Primary Examiner*—Cornelius J. Husar
*Assistant Examiner*—Joseph A. Fischetti
*Attorney, Agent, or Firm*—Marvin A. Naigur; Warren B. Kice

[57] ABSTRACT

An expansion seal assembly in which a corrugated plate extends between two members that are subjected to differential thermal expansion and contraction. An expansion joint connects the upper and lower edges of the corrugated plate with the two members respectively to accommodate differential thermal expansion and contraction between two members in an axial direction. The expansion joint acts as hinges to accommodate the lateral movement.

3 Claims, 3 Drawing Figures

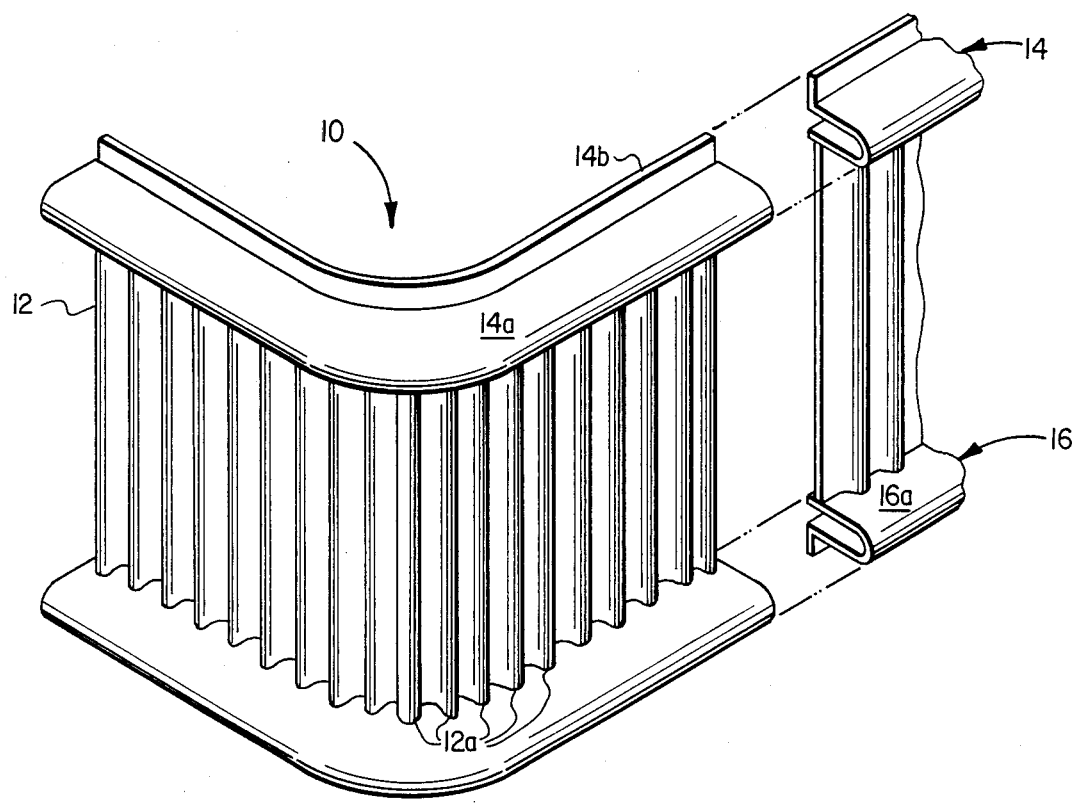
FIG. 1
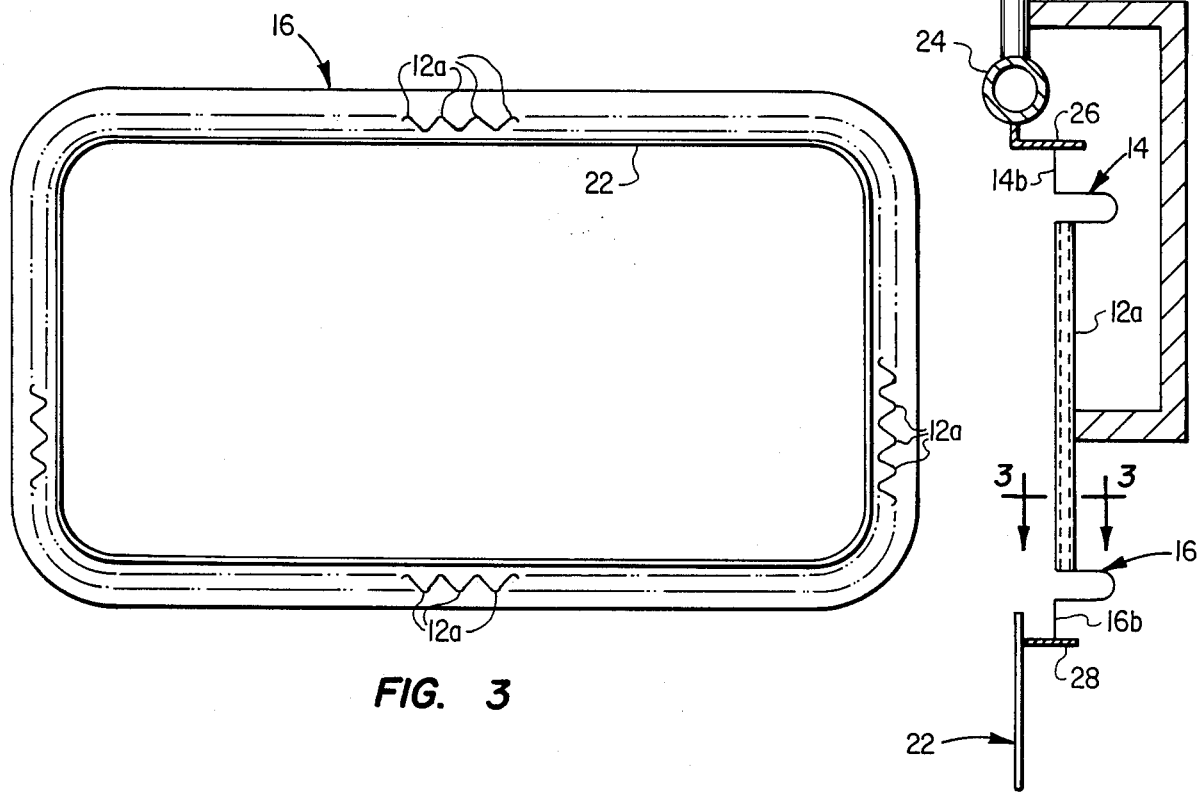
FIG. 3
FIG. 2

EXPANSION SEAL ASSEMBLY

BACKGROUND OF THE INVENTION

This invention relates to an expansion seal assembly and, more particulary, to such an assembly for sealingly connecting two spaced members subjected to differential temperatures which cause differential thermal expansion and contraction.

In many heat power applications, such as in the operation of boiler plants, or the like, it is often necessary to connect two components, such as the walls of a furnace with a corresponding duct, or the like, which components are at differential temperatures. Therefore, connections must be made which accommodate differential thermal expansion and contraction of the two components. This becomes exceedingly difficult since the relative expansion and contraction in a lateral direction takes place in two planes and still another expansion and contraction occurs in an axial direction.

The situation is further compounded due to the fact that the two components must be connected in a manner to provide an airtight seal between the components.

SUMMARY OF THE INVENTION

It is therefore an object of the present invention to provide an expansion seal assembly which accommodates differential thermal expansion and contraction between two components in a lateral direction and in an axial direction.

It is a further object of the present invention to provide a seal assembly of the above type in which the expansion and contraction are also accommodated in two planes in the lateral direction.

It is a still further object of the present invention to provide a seal assembly of the above type in which the expansion joint utilized to accommodate expansion in the axial direction also acts as a hinge for movement in a lateral direction.

Toward the fulfillment of these and other objects the expansion seal assembly of the present invention includes a corrugated plate extending between the two members with its corrugations extending vertically to accommodate differential thermal expansion and contraction in a lateral direction. A U-fold expansion joint connects the upper and lower edges of the corrugated plate with the two members, respectively, to accommodate differential thermal expansion and contraction between the two members in an axial direction.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein:

FIG. 1 is an enlarged perspective view showing a portion of the expansion seal assembly of the present invention;

FIG. 2 is a vertical cross section depicting the expansion and seal assembly of the present invention; and FIG. 3 is a cross-sectional view taken along the line 3—3 of FIG. 2.

DESCRIPTION OF THE PREFERRED EMBODIMENT

Referring specifically to FIG. 1 of the drawings, the reference numeral 10 refers in general to the expansion seal assembly of the present invention which includes a corrugated plate 12 having a plurality of corrugations 12a extending in a vertical direction as viewed in FIG. 1.

A U-fold expansion joint 14 is connected along the upper edge of the corrugated plate 12. The expansion joint 14 includes a plate 14a bent into a U configuration with the lower leg of the U being connected to the upper edge of the corrugated plate 12. A vertical flange 14b extends from the upper leg of the expansion joint 14 for reasons that will be described in detail later.

The lower edge of the corrugated plate 12 is connected to a lower U-fold expansion joint 16 having a plate 16a formed into a U-shape with the upper leg being connected to the lower edge of the corrugated plate 12 and its lower leg having a vertical flange 16b extending therefrom.

As better shown in FIG. 2, the seal assembly 10 is designed to connect the walls of a furnace, one of which is shown in general by the reference numeral 20, to a duct 22. Each furnace wall 20 is formed in a conventional manner by a plurality of water wall tubes (one of which is shown in FIG. 2) extending in a vertically spaced relationship and connected by means of continuous fins (not shown) disposed at diametrically opposed portions of the tubes and connected thereto in a conventional manner to render the wall air-tight. A horizontally extending header 24 is disposed at the lower end of the tubes forming each wall 20 for circulating water passing through the tubes to and from external equipment, in a conventional manner.

As shown in FIG. 3, the duct 22 has a substantially rectangular cross section which corresponds to the cross section of the furnace, so that the entire seal assembly of the present invention connects the duct to the lower end of the furnace in an airtight manner.

Referring again to FIG. 2, the flange 14b of the upper expansion joint 14 is connected to the header 24 by an angle iron 26 which is welded to the two components in a conventional manner. A bar 28 connects the lower flange 16b of the lower expansion joint 16 to a the outer surface of the upper end portion of the duct 22 to provide a sealing connection between the wall 20 and the duct 22.

An insulation box 30 extends from the lower exterior portions of the walls 20 to the center of the corrugated plate to transfer the thermal transient to the latter plate.

Since the temperature in the furnace is at an elevated temperature, such as 600° F., and the temperature at the duct 22 is much less, such as 200° F. it can be appreciated that there will be differential thermal expansion and contraction of the furnace walls 20 relative to the duct 22 in two lateral planes and one axial plane. This movement is accommodated by movement of the corrugated plate 12 in two lateral planes, one of which corresponds to the planes of the front and rear wall of the furnace and the other of which corresponds to the side walls of the furnace. Also, the expansion joints 14 and 16 accommodate relative axial movement between the furnace walls 20 and the duct 22. It is noted that the expansion joints 14 and 16 act as hinges to accommodate movement of the furnace walls 20 relative to the duct 22 in the aforementioned lateral planes.

It is apparent from the foregoing that the expansion seal assembly 10 of the present invention provides for differential thermal expansion and contraction of the furnace walls 20 and the duct 22 in two lateral planes, in addition to differential thermal expansion and contraction in an axial plane. This is accomplished while the overall seal arrangement is maintained in a stable configuration.

It is understood that several variations made be made of the foregoing without departing from the scope of the invention. For example, the expansion joint is not necessarily in a "U" configuration, but could be in a "W" or similar type configuration, and the connections between the joints could be varied without departing from the scope of the invention.

Other modifications, changes and substitutions are intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. An expansion seal assembly for sealingly connecting two vertically spaced members subject to differential thermal expansion and contraction, said assembly comprising a corrugated plate extending between the two members with its corrugations extending vertically to accommodate differential thermal expansion and contraction between the two members in at least one lateral direction, a first U-shaped expansion joint rigidly secured at its respective ends to the upper edge of said plate and to one of said members, and a second U-shaped expansion joint rigidly secured at its respective ends to the lower edge of said plate and to the other of said members, the ends of each of said expansion joints being movable relative to each other in a vertical direction to accommodate differential thermal expansion and contraction between said two members in an axial direction, and being movable relative to each other in a lateral direction to accommodate said thermal expansion and contraction between said members in said lateral direction.

2. The seal assembly of claim 1 wherein said lateral movement is in two planes.

3. The seal assembly of claim 1 further comprising an insulation box extending from the hotter of the two members to approximately midway between the upper and lower edges of said corrugated plate.

* * * * *